(12) United States Patent
Fraley (10) Patent No.: US 8,141,941 B2
(45) Date of Patent: Mar. 27, 2012

(54) SLIDABLE WINDOW ASSEMBLY WITH RETRACTABLE SUNSHADE

(75) Inventor: Josh David Fraley, South Lyon, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 12/842,325

(22) Filed: Jul. 23, 2010

(65) Prior Publication Data

US 2012/0019028 A1    Jan. 26, 2012

(51) Int. Cl.
*B60J 7/043* (2006.01)
(52) U.S. Cl. ........................................................ 296/214
(58) Field of Classification Search ............ 296/214
See application file for complete search history.

(56) References Cited

U.S. PATENT DOCUMENTS

| | | | |
|---|---|---|---|
| 4,320,921 A * | 3/1982 | Schatzler | 296/213 |
| 4,650,244 A * | 3/1987 | Boots | 296/223 |
| 4,702,517 A | 10/1987 | Maeda et al. | |
| 4,981,290 A * | 1/1991 | Huyer | 296/214 |
| 5,184,869 A * | 2/1993 | Bauer | 296/213 |
| 6,299,245 B1 | 10/2001 | Thiele et al. | |
| 6,309,013 B1 * | 10/2001 | Staltmayer et al. | 296/214 |
| 6,802,560 B2 | 10/2004 | Uehara et al. | |
| 6,817,658 B2 | 11/2004 | Ohnishi et al. | |
| 6,824,206 B1 * | 11/2004 | Tolinski | 296/214 |
| 6,974,181 B2 | 12/2005 | Mikkaichi et al. | |
| 7,014,243 B2 | 3/2006 | Nakajo | |
| 7,510,237 B2 | 3/2009 | Tsukamoto et al. | |
| 2011/0127804 A1 * | 6/2011 | Moenter et al. | 296/214 |

OTHER PUBLICATIONS

The Woodworker's Store, cover dated 1995, p. 17, "Stem Bumpers" and p. 31, "Round Cushions",three pages total.*

* cited by examiner

*Primary Examiner* — Dennis Pedder
(74) *Attorney, Agent, or Firm* — Gifford, Krass, Sprinkle, Anderson & Citkowski, P.C.

(57) ABSTRACT

A slidable window assembly mounted within the roof of an automotive vehicle is provided. The roof includes an opening and the slidable window assembly includes a window panel having a catch. The window panel is slidably mounted within the roof and slidable between an open position and a closed position. The slidable window assembly further includes a sunshade disposed beneath the window panel. The sunshade is also slidable between an open and closed position. The sunshade has a first surface facing the window panel and a stop mounted on the first surface. The catch is operable to engage the stop so as to move the sunshade from the closed position to the open position.

12 Claims, 6 Drawing Sheets

SLIDABLE WINDOW ASSEMBLY WITH RETRACTABLE SUNSHADE

BACKGROUND OF THE INVENTION

1. Field of the Invention

The present invention relates generally to a slidable window assembly mounted in an opening of a roof of an automotive vehicle.

2. Description of Material Art

Slidable window assemblies mounted in an opening of a roof of an automotive vehicle are commonly referenced as a moonroof or a sunroof. The window assemblies are typically actuated by a drive which moves a glass panel between an open position and a closed position. Naturally, in the open position the glass panel is retracted and the opening is exposed. However, in the closed position the glass panel is driven forward from the open position so as to be disposed within the opening and thus close the opening from the environment.

Such window assemblies may further include a sunshade. The sunshade is generally disposed below the glass panel and is also movable between an open and a closed position. The sunshade may have a cabin surface that is lined with the vehicle's headliner material so as to present a uniform and aesthetically pleasing interior cabin space. In many cases the sunshade may be formed of an opaque material operable to block sunlight and help keep the vehicle's cabin cool. Accordingly, when the sunshade is fully closed, the position of the glass panel may not necessarily be known. Thus in certain instances the glass panel may be in the open position and the sunshade in the closed position. In such instances the vehicle may be exposed to elements such as rain, sleet, or snow without the user knowing. Accordingly, it remains desirable to have a slidable window assembly operable to ensure that the glass panel is not in the open position when the sunshade is in the closed position.

SUMMARY OF THE PRESENT INVENTION

The present invention provides a slidable window assembly mounted in the opening of a roof of an automotive vehicle which overcomes the above-mentioned disadvantages. In brief, the slidable window assembly includes a window panel having a catch. The window panel is slidably mounted along the roof and is slidable between an open position wherein the opening is open and a closed position wherein the opening is closed by the window panel. The slidable window assembly further includes a sunshade disposed beneath the window panel.

The sunshade is also slidable between an open and closed position. In the closed position the sunshade is positioned to the front of the vehicle so as to conceal the glass panel and close the opening. The sunshade includes a first surface facing the window panel. A stop is mounted on the first surface. The stop extends upwardly from the first surface towards the window panel. The catch is operable to engage the stop so as to move the sunshade from the closed position to the open position. Accordingly, the window assembly is configured to prevent the sunshade from moving past the window panel to a closed position thus ensuring that the window panel is not in the open position when the sunshade is in the closed position.

BRIEF DESCRIPTION OF THE DRAWINGS

A better understanding of the present invention will be had upon reference to the following detailed description when read in conjunction with the accompanying drawings wherein like reference characters refer to like parts throughout the several views and in which.

DETAILED DESCRIPTION OF THE INVENTION

Figure 1:
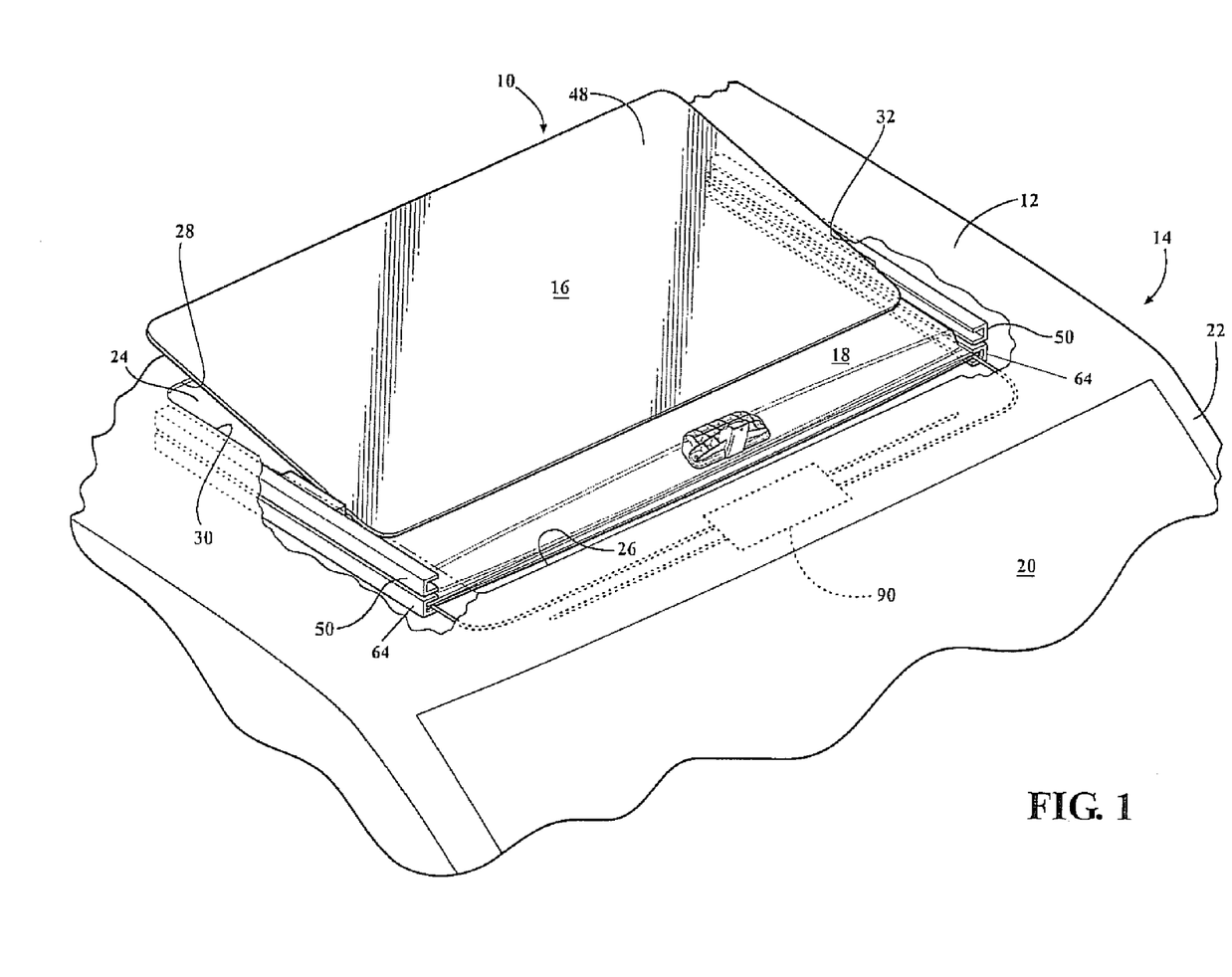
FIG. 1 is a perspective view of the roof of an automotive vehicle having a slidable window assembly mounted within the roof.

With reference first to FIG. 1, a perspective view of a slidable window assembly 10 mounted within the roof 12 of an automotive vehicle 14 according to the present invention is provided. The window assembly 10 includes a window panel 16 and a sunshade 18. The window assembly 10 is configured to drag the sunshade 18 from a closed position to an open position along with the window panel 16. Accordingly, the window assembly 10 helps prevent unwanted elements such as rain or snow from entering the cabin space by preventing a condition wherein the window panel 16 is in an open position and the sunshade 18 is in a closed position.

The automotive vehicle 14 includes a front windshield 20, and a plurality of pillars 22. The pillars 22 support the roof 12. The roof 12 includes an opening 24 having a forward edge 26 opposite a rear edge 28 and a first side edge 30 opposite a second side edge 32. The forward edge 26 is closer to the front of the vehicle 14 than the rear edge 28 and the first and second side edges 30, 32 extend between the forward and rear edges 26, 28. The roof 12 may be formed by an inner sheet of metal spaced apart from an outer sheet of metal. The roof 12 is supported by a plurality of pillars 22.

As shown in FIGS. 2-5, the roof 12 may further include a plurality of drain troughs 34. The drain troughs 34 are located on respective forward and rear edges 26, 28 of the opening 24. The drain troughs 34 are generally u-shaped and extend between opposing sides of the roof 12. The drain troughs 34 are configured to collect liquids and provide and direct the liquids to drain along the exterior of the roof 12.

Figure 7:
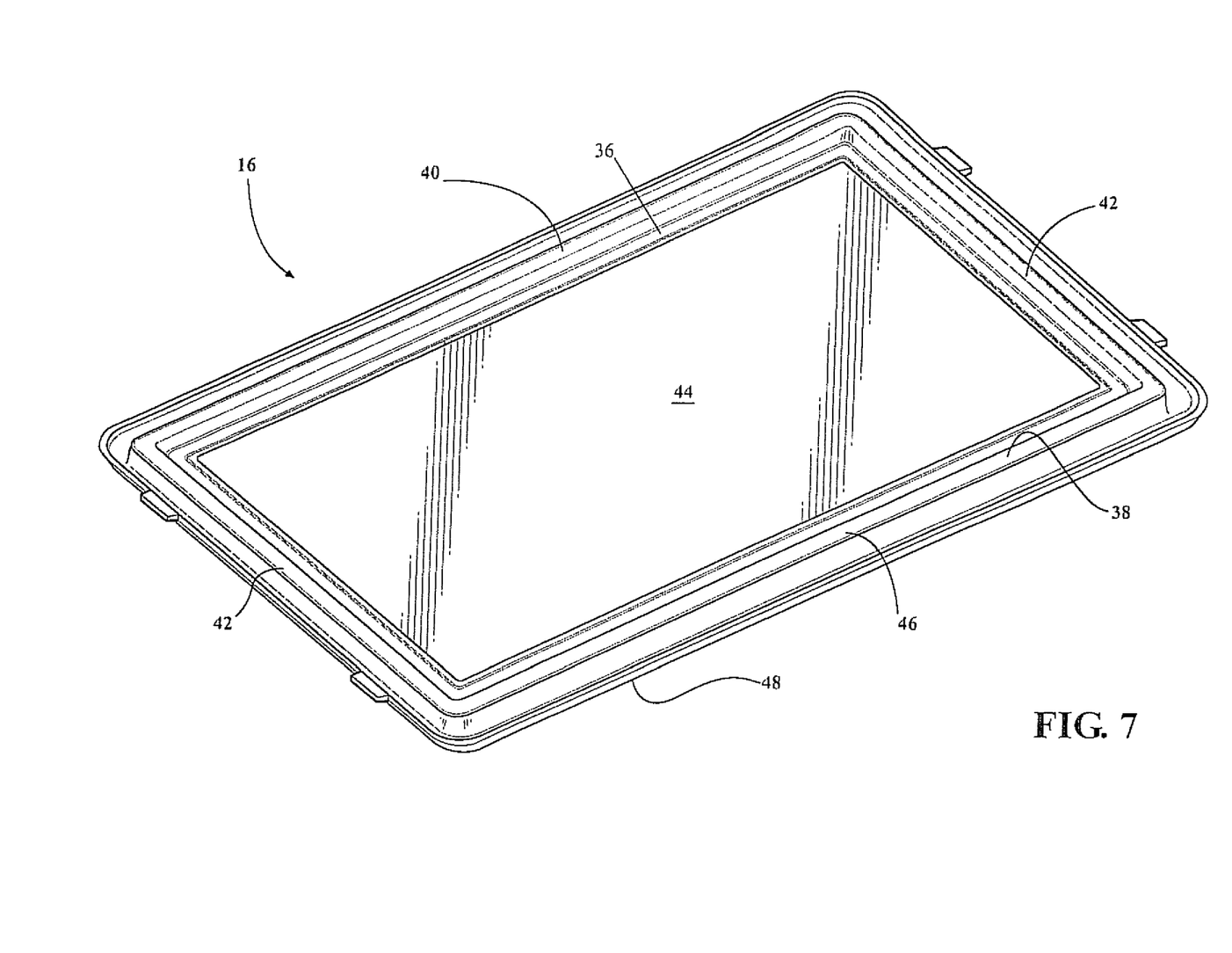
FIG. 7 is a perspective view of the window panel.

With reference now to FIG. 7, a perspective view of the window panel 16 is provided. The window panel 16 further includes a reinforcement panel 36 generally bounding the inner peripheral edge of the window panel 16. The reinforcement panel 36 includes a front portion 38 opposite a rear portion 40 and a pair of opposing side portions 42 extending between the front and rear portions 38, 40. As used herein, the front refers to the portion of the vehicle 14 adjacent the driver windshield, whereas the rear refers to the portion of the vehicle 14 adjacent the trunk. The reinforcement panel 36 may be formed of metal and is disposed on the second surface 44 of the window panel 16. The front portion 38 of the reinforcement panel 36 forms a catch 46. The window panel 16 is slidably mounted within the roof 12 between respective inner and outer sheets of metal. The window panel 16 includes an exterior surface 48 exposed to the environment and a second surface 44 opposite the exterior surface 48. The window panel 16 may be formed of a transparent material such as glass. The window panel 16 is slidable between an open position and a closed position. In the open position the window panel 16 is retracted so as to open the opening 24. In the closed position the window panel 16 is disposed within the opening 24 so as to close the opening 24. The window panel 16 may be automatically or manually driven between the closed and open position.

Figure 8:
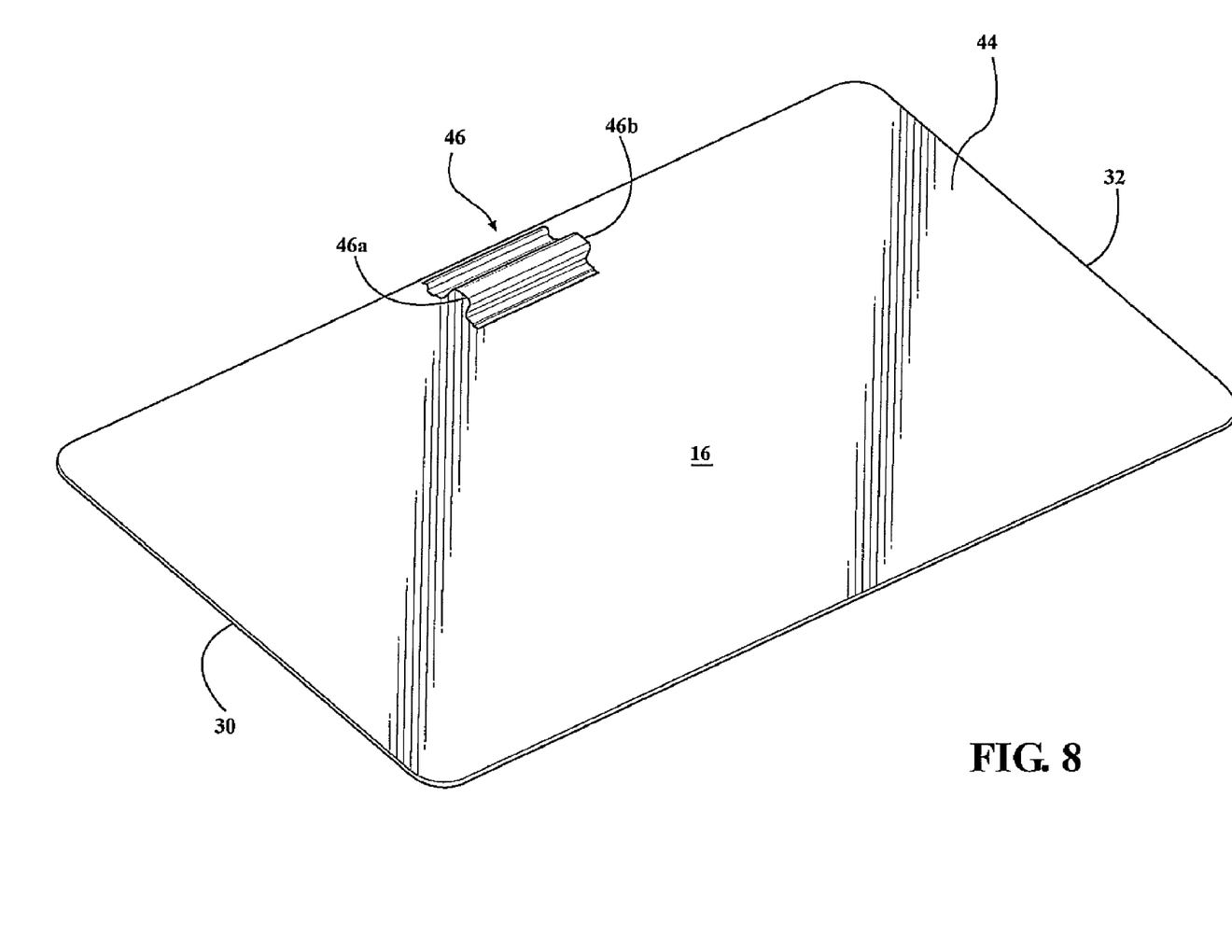
FIG. 8 is a perspective view of a second preferred embodiment of the present invention.

With reference now to FIG. 8, a second preferred embodiment of the catch 46 is provided. The catch 46 is mounted on the second surface 44 of the window panel 16. Further, the catch 46 is generally disposed in the middle of the front edge of the window panel 16. The catch 46 includes a pair of opposing side edges 46a, 46b. The side edges 46a, 46b are free standing and spaced apart from respective side edges 30, 32 of the window panel 16.

The slidable window assembly 10 may further include a pair of first rails 50. One of the pair of first rails 50 is spaced apart from the other. One of the pair of first rails 50 extends longitudinally along the first side edge 30 of the opening 24 and the other of the pair of first rails 50 extends longitudinally along the second side edge 32 of the opening 24. The first rails 50 may be formed from metal and are operative to guide the window panel 16 between the open and closed position.

Figure 6:
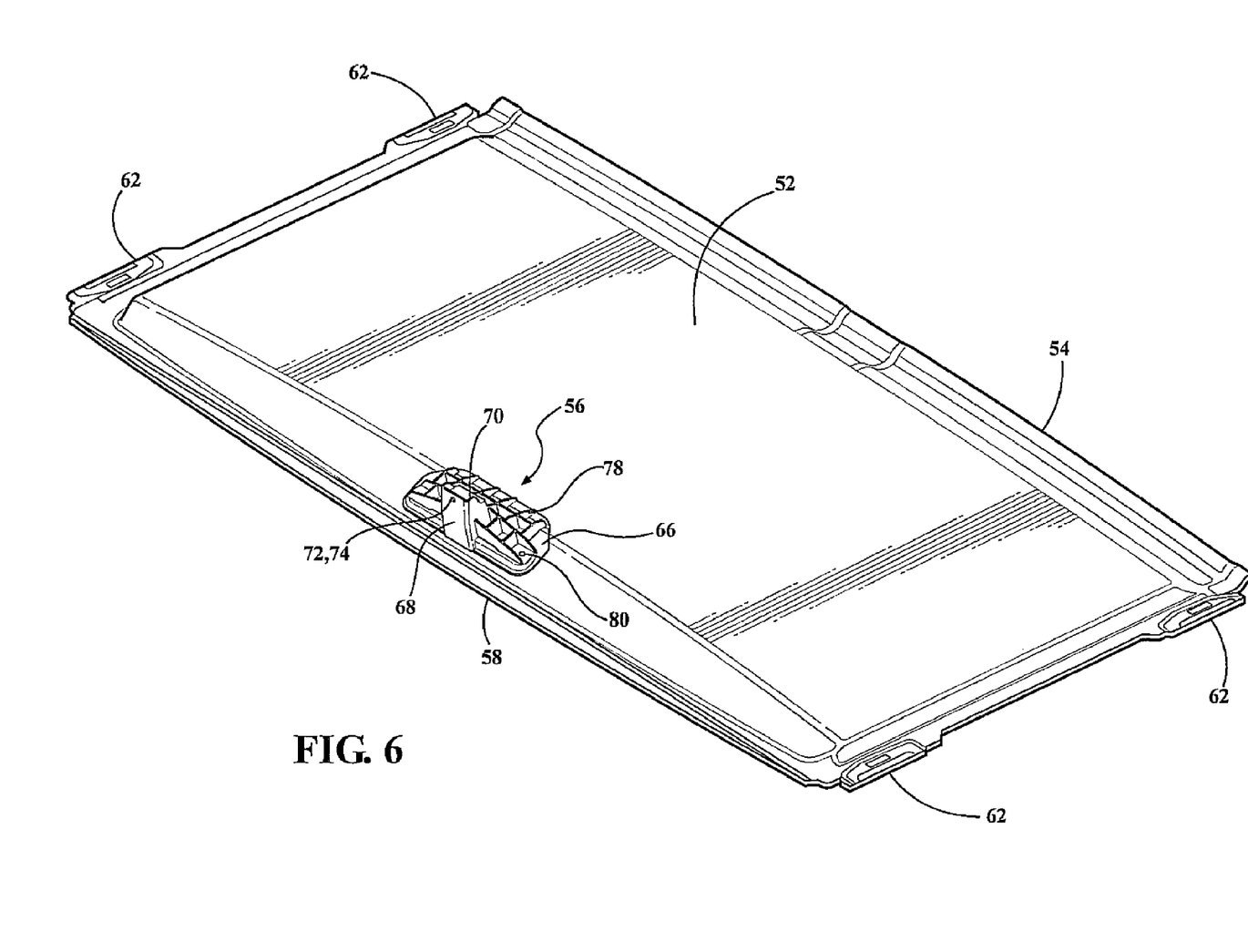
FIG. 6 is a perspective view of the sunshade.

With reference now to FIG. 6, a perspective view of the sunshade 18 is provided. The sunshade 18 is disposed beneath the window panel 16. The sunshade 18 is also slidable between the open and closed position. The sunshade 18 may be opaque and formed from layers of pressed composite fiber material. The sunshade 18 has a first surface 52 facing the window panel 16 and a cabin surface 54 exposed to the cabin space of the vehicle 14. The cabin surface 54 is opposite the first surface 52. The cabin surface 54 of the sunshade 18 may be lined with the vehicle's 14 headliner material. Preferably the liner is of the same material as the headliner so as to present an aesthetic cabin environment. The sunshade 18 further includes a stop 56 mounted on the first surface 52. The stop 56 extends away from the first surface 52 a predetermined length. The catch 46 is operable to engage the stop 56 so as to move the sunshade 18 from the closed position to the open position.

The sunshade 18 further includes a handle 58 mounted on the cabin surface 54 of the sunshade 18. The handle 58 includes a gripping portion 60 configured to be manipulated by a hand. The handle 58 may be pulled or pushed so as to slide the sunshade 18 between the open and closed position. The handle 58 may be injection molded from polypropylene. The stop 56 is mounted opposite the handle 58. The stop 56 may be fastened to the handle 58 so as to secure the two together.

The sunshade 18 may further include a plurality of guide shoes 62. The guide shoes 62 are disposed on respective side edges 30, 32 of the sunshade 18 and engage a pair of sunshade rails 64. The sunshade rails 64 are disposed beneath the pair of first rails 50 and are operable to guide the sunshade 18 between the open and closed position.

The stop 56 may be molded from a polypropylene resin. The stop 56 includes a base 66 and an elongated member 68 projecting from the base 66 to a distal end 70. The base 66 is mounted onto the first surface 52 of the sunshade 18 and the elongated member 68 projects upwardly from the first surface 52 of the sunshade 18 towards the second surface 44 of the window panel 16. A portion of the elongated member 68 is configured to engage the catch 46. More specifically, as the window panel 16 is moved from the closed position to the open position, the window panel 16 is slid towards the rear of the vehicle 14 along the pair of rails 50, 64 wherein the catch 46 engages the elongated member 68 and drags the sunshade 18 with the window panel 16 in a partially open position.

In a preferred embodiment, the stop 56 further includes a bumper 72 mounted onto the distal end 70 of the elongated member 68. An end portion 74 of the bumper 72 is displaced relative to the distal end 70 of the elongated member 68. The end portion 74 of the bumper 72 is operable to engage the catch 46. The bumper 72 may be formed of a polypropylene resin and is generally resilient so as to help absorb the force of contact between the catch 46 and the stop 56. The bottom surface of the base 66 may further include a plurality of spikes 76. The spikes 76 are operable to engage the first surface 52 of the sunshade 18 so as to help retain the sunshade 18 with respect to the base 66 during impact from the catch 46 and the stop 56. The stop 56 may further include a plurality of ribs 78. The ribs 78 extend upwardly from the base 66 and interconnect a portion of the elongated member 68 to the base 66 so as to help reinforce and maintain the elongated member 68 in a predetermined position.

The stop 56 may be integrally formed to the front edge of the sunshade 18 or may be a separate unit that is fastened onto the sunshade 18 using fastening devices such as a screw, an adhesive, or the combination of both. Alternatively, the stop 56 may include a first aperture 80 adaptable to receive a male end (not shown) of a pull cup screw (not shown).

The window assembly 10 may further include a drive 90 so as to be automatically driven between the closed and open position. The drive 90 is operatively connected to the window panel 16 and may be actuated by a button disposed in the cabin of the vehicle 14. For instance, the drive 90 may include a motor and a cable. An end of the cable may be fixedly mounted to the window panel 16. The motor is operable to push and pull the cable so as to move the window panel 16 between the open and closed position.

Figure 2:
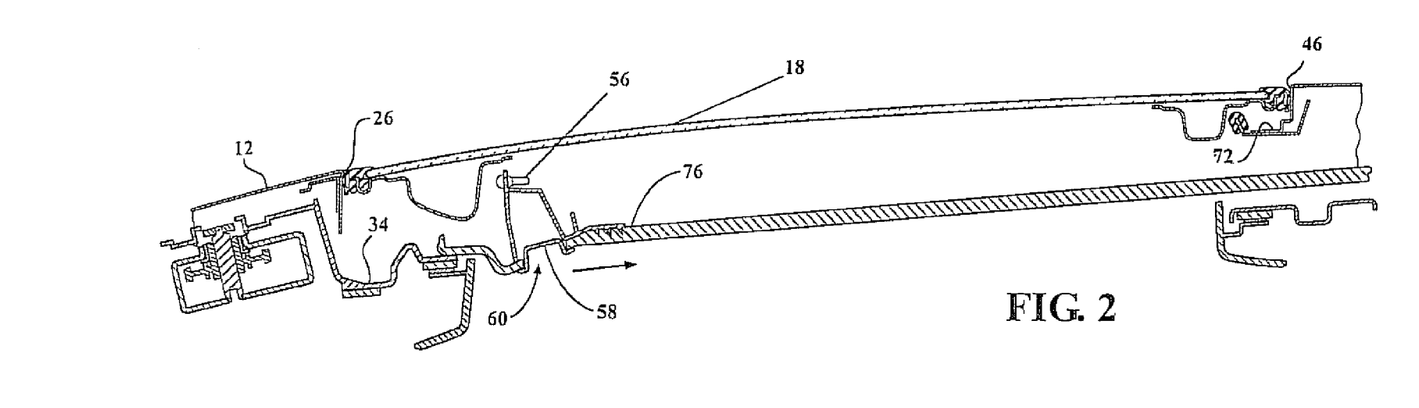
FIG. 2 is a cross-sectional view of FIG. 1 taken along lines 2-2 showing the window assembly in the closed position.

With reference now to FIGS. 2-5, the operation of the window assembly 10 is provided. With reference first to FIG. 2, a cross-sectional view of FIG. 1 taken along lines 2-2 is provided. The cross-sectional view shows the window panel 16 and sunshade 18 in the closed position. The catch 46 is disposed on the second surface 44 of the window panel 16 and along the front of the window panel 16. In the closed position, a portion of the catch 46 is spaced apart from the stop 56. Further, the sunshade 18 is engaged with the front edge of the opening 24 of the roof 12 in the closed position. Accordingly, the catch 46 is disposed closer to the forward edge 26 than the stop 56.

Figure 3:
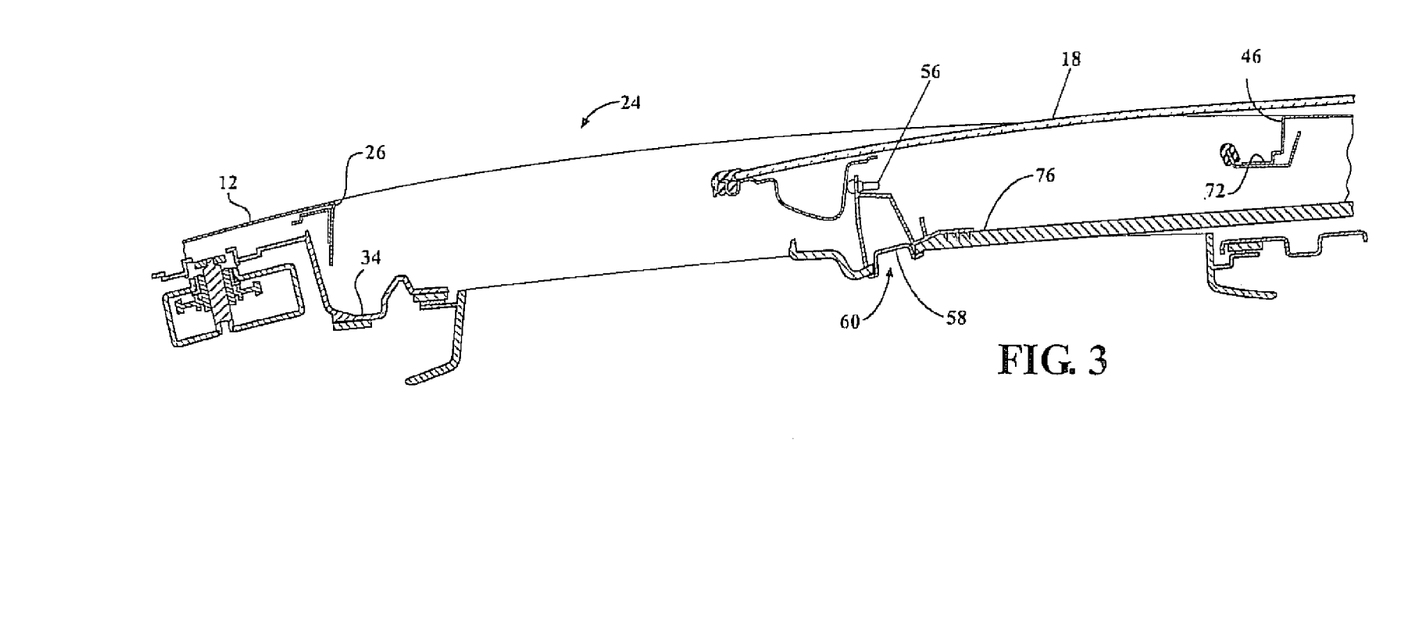
FIG. 3 is a cross-sectional view of the roof showing the window assembly between the open and closed position.

With reference now to FIG. 3, a cross section of the slide window assembly 10 showing the window panel 16 and sunshade 18 in a partially open position is provided. As shown, the catch 46 is engaged with the bumper 72. Specifically, as the window panel 16 is slid rearward from the closed to a partially open position, the catch 46 engages the stop 56 and also drags the sunshade 18 from the open position to a partially closed position.

Figure 4:
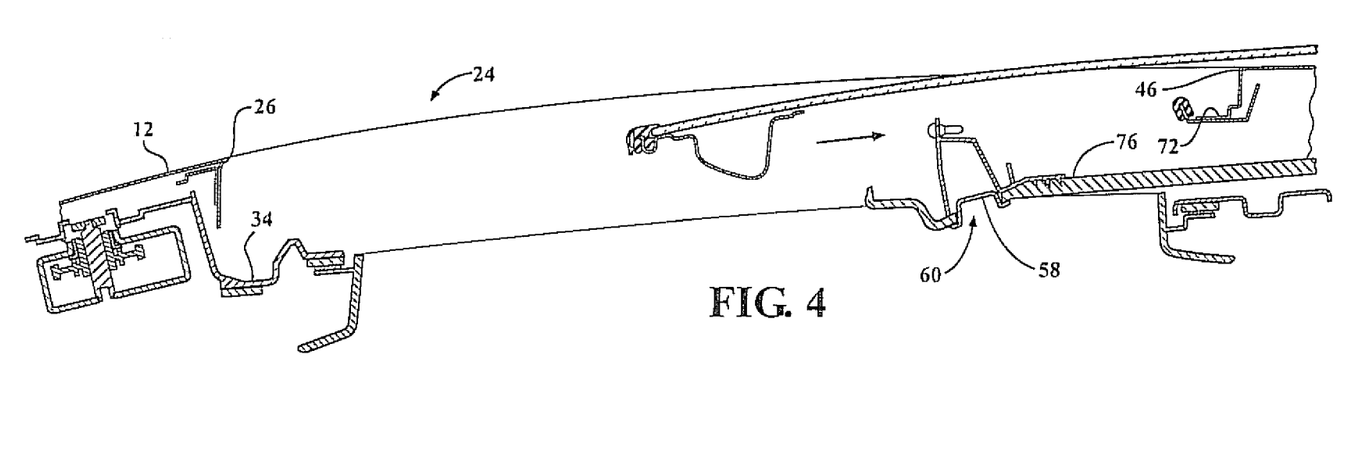
FIG. 4 is a cross-sectional view of the roof showing the window assembly showing the stop displaced from the catch.

As shown in FIG. 4, cross section showing the catch 46 displaced from the bumper 72 is provided. A user may manually pull or slide the sunshade 18 fully to the rear. It should be appreciated that the sunshade 18 may be moved from the closed position to the open position independently of the window panel 16. However, the sunshade 18 may not be moved forward of the catch 46 thus preventing a condition wherein the sunshade 18 is in the closed position and the window panel 16 is in the open position.

Figure 5:
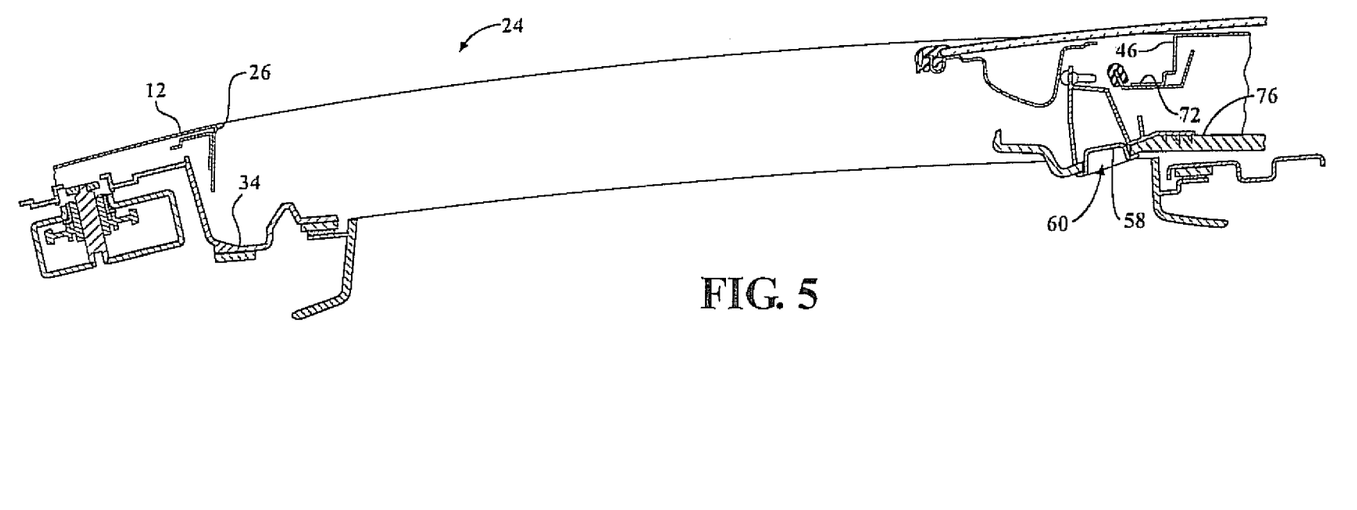
FIG. 5 is a cross-sectional view of the roof showing the window assembly in an open position.

With reference now to FIG. 5, a cross-sectional view of the window assembly 10 in the open position is provided. In the open position, the window panel 16 is fully retracted and the opening 24 is open. Further, the window panel 16 has dragged the sunshade 18 into the open position as well. The catch 46 is positioned so as to block the stop 56 and thus preventing the sunshade 18 from being moved to the closed position.

Having described my invention, many modifications thereto will become apparent to those skilled in the art to which it pertains without deviation from the scope and spirit of the invention as defined by the scope of the appended claims.

I claim:

1. A slidable window assembly mounted in a roof of an automotive vehicle, the roof having an opening having a forward edge opposite a rear edge, and a first side edge opposite a second side edge, the slidable window assembly comprising:
   a window panel having a catch, the window panel mounted to the opening of the roof and slidable between an open position wherein the opening is open, and a closed position wherein the opening is closed; and
   a sunshade disposed beneath the window panel and slidable between the open and closed position, the sunshade having a first surface facing the window panel, a stop mounted on the first surface, the stop including a base mounted to the first surface and extending rearwardly toward the rear edge, the base having a plurality of spikes, each of the plurality of spikes engaging the first surface of the sunshade, an elongated member having a distal end, the elongated member projecting from the base towards the window panel, a resilient bumper mounted onto the distal end of the elongated member, the catch disposed closer to the forward edge than the stop, the catch forward of the stop so as to prevent the stop from moving past the catch so as to prevent the window panel from being in the open position and the sunshade in the closed position, the catch operable to engage the bumper so as to help absorb force applied to the stop so as to drag the sunshade from the closed position to the open position when the window panel is moved from the closed position to the open position.

2. The slidable window assembly as set forth in claim 1, wherein the window panel includes a second surface facing the first surface of the sunshade, the catch mounted on the second surface.

3. The slidable window assembly as set forth in claim 2, wherein the window panel further includes a front edge, the catch mounted on the front edge of the window panel.

4. The slidable window assembly as set forth in claim 1, wherein the bumper is made of polypropylene resin.

5. The slidable window assembly as set forth in claim 1, wherein the stop further includes a rib extending between the elongated member and the base, the rib operable to provide structural support for the stop.

6. A slidable window assembly mounted in an opening of a roof of an automotive vehicle, the opening having a forward edge opposite a rear edge, and a first side edge opposite a second side edge, the slidable window assembly comprising:
   a pair of rails spaced apart from each other, one of the pair of rails extending longitudinally along the first side edge of the opening and the other of the pair of rails extending longitudinally along the second side edge of the opening;
   a window panel having a catch, the window panel mounted between the pair of rails and slidable between an open and closed position, wherein in the open position the opening is open, wherein in the closed position the opening is closed;
   a drive operatively connected to the window panel, the drive operable to move the window panel between the open and closed position; and
   a sunshade disposed beneath the window panel and slidable between the open and closed positions, the sunshade having a first surface facing the window panel, a stop mounted on the first surface, the stop includes a base mounted to the first surface and extending rearwardly toward the rear edge, the base having a plurality of spikes, each of the plurality of spikes engaging the first surface of the sunshade, an elongated member having a distal end, the elongated member projecting from the base towards the window panel, a resilient bumper mounted onto the distal end of the elongated member, the catch disposed closer to the forward edge than the stop, the catch operable to engage the bumper so as to help absorb force applied to the stop so as to drag the sunshade from the closed position to the open position when the window panel is moved from the closed position to the open position.

7. The slidable window assembly as set forth in claim 6, wherein the window panel includes a second surface facing the first surface of the sunshade, the catch mounted on the second surface.

8. The slidable window assembly as set forth in claim 7, wherein the window panel further includes a front edge, the catch mounted on the front edge of the window panel.

9. The slidable window assembly as set forth in claim 8, wherein catch is disposed closer to the forward edge than the stop.

10. The slidable window assembly as set forth in claim 6, wherein the bumper is made of polypropylene resin.

11. The slidable window assembly as set forth in claim 6, wherein the stop further includes a rib extending between the elongated member and the base, the rib operable to provide structural support for the stop.

12. The slidable window assembly as set forth in claim 6, further including a handle, the sunshade having a cabin surface opposite the first surface, the handle mounted on the cabin surface of the sunshade opposite the stop.

* * * * *

UNITED STATES PATENT AND TRADEMARK OFFICE
CERTIFICATE OF CORRECTION

PATENT NO. : 8,141,941 B2  
APPLICATION NO. : 12/842325  
DATED : March 27, 2012  
INVENTOR(S) : Josh David Fraley Page 1 of 1

It is certified that error appears in the above-identified patent and that said Letters Patent is hereby corrected as shown below:

Column 6, claim 9, line 41, after wherein, insert --the--

Signed and Sealed this  
Thirty-first Day of July, 2012

David J. Kappos  
*Director of the United States Patent and Trademark Office*